Nov. 11, 1969  D. V. LOUZOS  3,477,958
ELECTROLYTE FOR SOLIONS
Filed April 22, 1959

INVENTOR.
DEMETRIOS V. LOUZOS
BY
John F Hohmann
ATTORNEY

United States Patent Office 3,477,958
Patented Nov. 11, 1969

3,477,958
ELECTROLYTE FOR SOLIONS
Demetrios V. Louzos, Rocky River, Ohio, assignor to Union Carbide Corporation, a corporation of New York
Filed Apr. 22, 1959, Ser. No. 808,057
Int. Cl. H01g 9/00
U.S. Cl. 252—62.2      2 Claims This invention relates to electrolytes for solions and refers more particularly to electrolytes suitable for use at temperatures below the freezing point of water.

A family of electrochemical devices utilizing solutions of ions has recently attracted considerable favorable attention. These devices have been termed "Solions." Typical solions are described by Hurd and Lane in volume 104, No. 12. "Journal of the Electrochemical Society," December 1957; by Reed and McQuitty, volume XXXII, No. 5, "Yale Scientific Magazine," February 1958; and in "Electronics Products Engineering Bulletin" #1, published November 1957 by National Carbon Company, 30 E. 42nd Street, New York, N.Y. In these devices a solution referred to as an electrolyte is used which contains a reversible redox system. The concentration of one of the species of the redox system is measurable and gives an indication of the passage of ions from one portion of the device to another. The reversible redox system most used in solions is the iodine-iodide system in an aqueous solution of potassium iodide, although other redox systems such as the ferricyanide-ferrocyanide, bromine-bromide, ferric-ferrous, and ceric-cerous systems have been recommended for such use. A common characteristic of all the electrolyte solutions is that they are aqueous and have freezing points generally not much below the freezing point of water. For some applications it is desirable that a solion be capable of use at temperatures below the freezing point of water.

It is the principal object of this invention to provide an electrolyte for solions capable of use at very low temperatures.

Figure 1:
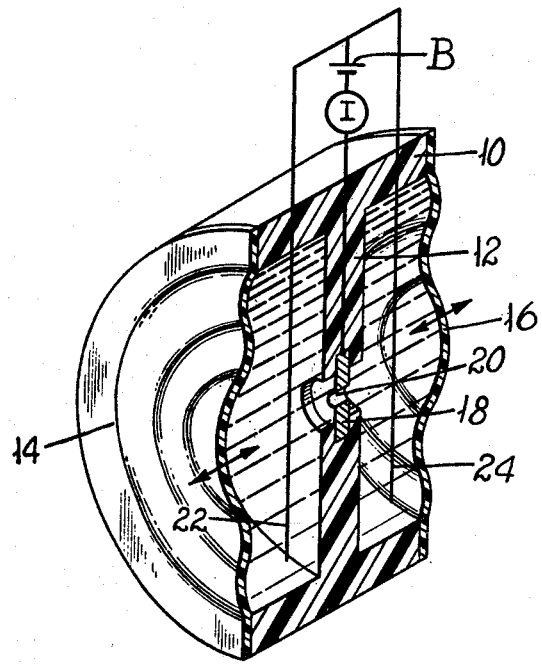
Figure 2:
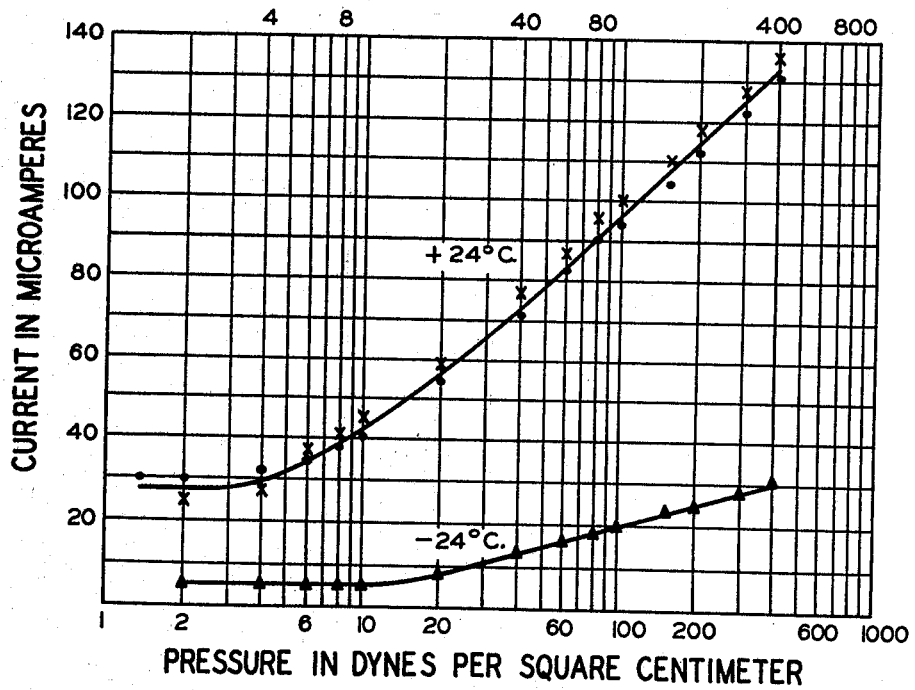

The invention will be described with reference to the accompanying drawing in which:

FIG. 1 is a vertical section of a typical solion, containing an electrolyte embodying the invention; and FIG. 2 is a pair of curves illustrating performance characteristics of a solion of the type illustrated in FIG. 1 at different temperatures.

The invention comprises an electrolyte for use in solions, which electrolyte contains in aqueous solution a reversible redox system and a lithium salt. In the electrolyte of the invention, a metal ion is oxidized and reduced between two valence states in a negative ion environment provided by a soluble lithium salt, the latter acting as the supporting electrolyte for the system. Suitable redox systems include those specified above: iodine-iodide; ferricyanide - ferrocyanide; bromine - bromide; ferric-ferrous; ceric-cerous. The lithium salt may be any soluble lithium salt, but the particular salt and redox system selected must be so selected that all species or compounds present or formed in the electrolyte are soluble. For example, lithium tartrate is soluble and is a useful salt in combination with some redox systems, but would not be suitable in the ferric-ferrous tartrate system, for ferrous tartrate is only slightly soluble in water.

Bearing in mind the limitation just discussed, among the lithium salts contemplated in the invention are the following:

lithium acetate
lithium tetraborate
lithium bromide
lithium chlorate
lithium perchlorate
lithium chloride
lithium chromate
lithium dichromate
lithium citrate
lithium fluosilicate
lithium fluosulfonate
lithium iodide
lithium nitrate
lithium salicylate
lithium sulfate
lithium tartrate
lithium thiocyanate A number of combinations of redox system and lithium salt are recommended; for example in the ferric-ferrous system, lithium thiocyanate, lithium fluosilicate and lithium bromide are combinations in which all species or compounds present or formed are soluble. In combination with the bromine-bromide redox system, lithium bromide is the most attractive salt. The presently preferred electrolyte utilizes the iodine-iodide redox system with lithium iodide. Specifically, a preferred electrolyte is an aqueous solution 0.1 normal in iodine and 5.53 normal in lithium iodide.

Tests of solions using an electrolyte of the specific composition just described have shown it to be useful over a very wide temperature range including temperatures well below zero on the Centigrade scale. Referring to the drawing, a solion of the type illustrated in FIG. 1 was used in the testing program. The device illustrated is referred to as a "log detector"; it is logarithmically responsive to acoustic pressure, producing an electric current. It comprises a housing 10 divided into two compartments by an apertured partition 12 and a pair of flexible diaphragms 14, 16 mounted on opposite sides of the housing 10. An electrode 18 having an aperture 20 is mounted in the partition 12, access between the two compartments being solely through the aperture 20. The two compartments are filled with liquid electrolyte, in the specific instance to be described with the iodine-lithium iodide solution above discussed. In each compartment is one of a pair of electrodes 22, 24 connected to a battery B, the electrodes 22, 24 being anodes. The electrode 18 is connected through an ammeter to the battey B and is the detecting cathode of the device. When pressure is applied to either of the diaphragms 14, 16, liquid tends to flow through the aperture 20 of the electrode 18. This causes a flow of current which is measured by the ammeter.

In conducting tests of the electrolyte of the invention, measured pressure was applied to one diaphragm of a solion of the type just described provided with an aqueous iodine (0.1 normal) -lithium iodide (5.53 normal) solution as electrolyte. The voltage of the battery B was 0.9 volt. Varying pressures were applied while the device was maintained at 24° C. and at −24° C. Good response was obtained throughout the test as shown by the curves of FIG. 2. It will be noted that the curve is shifted downward at the low temperature. This is to be expected in view of decrease in electrolyte conductance at low temperatures. By changing the aperture in the detecting cathode, the curve for current response can be shifted.

From the above discussion it will be apparent that the invention extends the usefulness of solions to low temperature ranges. It will also be evident to those skilled in the art that the invention is of wide utility and that the specific examples described herein are illustrative of its principles rather than its scope.

I claim:
1. An electrolyte composed of an aqueous solution of a reversible redox system consisting of iodine and lithium iodide as the supporting electrolyte.

2. An electrolyte composed of an aqueous solution of iodine and lithium iodide, the normality of such solution with respect to iodine being about 0.1 and with respect to lithium iodide being about 5.53.

References Cited

UNITED STATES PATENTS

| | | | |
|---|---|---|---|
| 2,250,212 | 7/1941 | Suits | 252—62.2 |
| 2,368,688 | 2/1945 | Taylor | 252—62.2 |
| 2,759,131 | 8/1956 | Ross | 252—62.2 |
| 2,759,132 | 8/1956 | Ross | 252—62.2 |
| 2,764,653 | 9/1956 | Schoeppel et al. | 252—62.2 |
| 2,778,754 | 1/1957 | Shorr | 252—62.2 |
| 2,834,926 | 5/1958 | Booe | 252—62.2 |
| 2,899,393 | 8/1959 | Schoeppel et al. | 252—62.2 |

OTHER REFERENCES

Hurd et al., "Principles of Very Low Power Electrochemical Control Devices," J. Electrochem. Soc., vol. 104, 1957, pp. 727–730.

Mellor's Comprehensive Treat. on Inorg. Chem., Supp. II, Part I, Longmans, Green & Co., 1956, p. 838.

TOBIAS E. LEVOW, Primary Examiner

J. COOPER, Assistant Examiner

U.S. Cl. X.R.

317—230